March 1, 1955 L. H. REAGAN 2,703,342

TRANSMISSION OF CONTROL SIGNALS IN A TELECOMMUNICATION SYSTEM

Filed Oct. 15, 1952 3 Sheets-Sheet 1

INVENTOR
LEON H. REAGAN
BY T. L. Bowes
ATTORNEY

INVENTOR
LEON H. REAGAN
BY T. L. Bowes
ATTORNEY

INVENTOR
LEON H. REAGAN
BY T. L. Bowes
ATTORNEY

United States Patent Office 2,703,342

Patented Mar. 1, 1955

2,703,342

TRANSMISSION OF CONTROL SIGNALS IN A TELECOMMUNICATION SYSTEM

Leon H. Reagan, Richland, Wash., assignor to Stromberg-Carlson Company, a corporation of New York Application October 15, 1952, Serial No. 314,855

6 Claims. (Cl. 179—27)

This invention relates to signaling systems and particularly to means for the transmission of control signals in a telecommunication system.

The object of the invention is economy, dependability and adaptability in outgoing circuits from a switchboard employing a universal cord circuit.

The invention resides in the circuit arrangement of an outgoing trunk circuit terminating in a selector and which is marked by great simplicity and economy of apparatus, employing a minimum of relays having no marginal, differential or polar operating characteristics. Dialing and supervision are accomplished over the sleeve and the talking circuit is encumbered with but a single switching contact whereby the possibility of noise is very greatly reduced.

A feature of the invention is a dialing circuit extending through the sleeve of the trunk jack and a contact mechanically closed by the insertion of the cord circuit plug into the jack. Dial pulses are thus transmitted over the sleeve of the cord and trunk circuits in a circuit completed both by electrical connection through and mechanical connection made by the trunk jack.

Another feature of the invention is a circuit completed through the sleeve of the cord circuit and the trunk circuit which functions as a supervisory circuit to notify the operator of the condition of the connection, that is whether or not the called subscriber has answered, as a start stop dial signal circuit, that is whether the facilities on the connection are ready to receive dial pulses, and as a dial circuit. The cord circuit is provided with a supervisory lamp associated with each plug and when the operator's dial key is not operated this supervisory lamp functions. When the cord dial key is operated then the dial start stop lamp functions. When the dial is operated the off normal contacts of the dial temporarily appropriate this sleeve circuit and employ it for the transmission of dial pulses.

Another feature of the invention is the ringing control means. During dialing, a signal is transmitted over a separate control conductor marking the call through the selector and other circuits involved in the connection as a toll call and functioning to withhold ringing at the distant end. Thereafter the operator may transmit ringing current out over the tip and ring to the trunk circuit where such signal will be translated into a ringing control signal on the said separate control conductor. Thus the operator may control the ringing at the distant end of the connection to call and to recall the called subscriber.

Other features will appear hereinafter.

The drawings consist of three sheets having four figures, as follows.

Figures 1, 2:
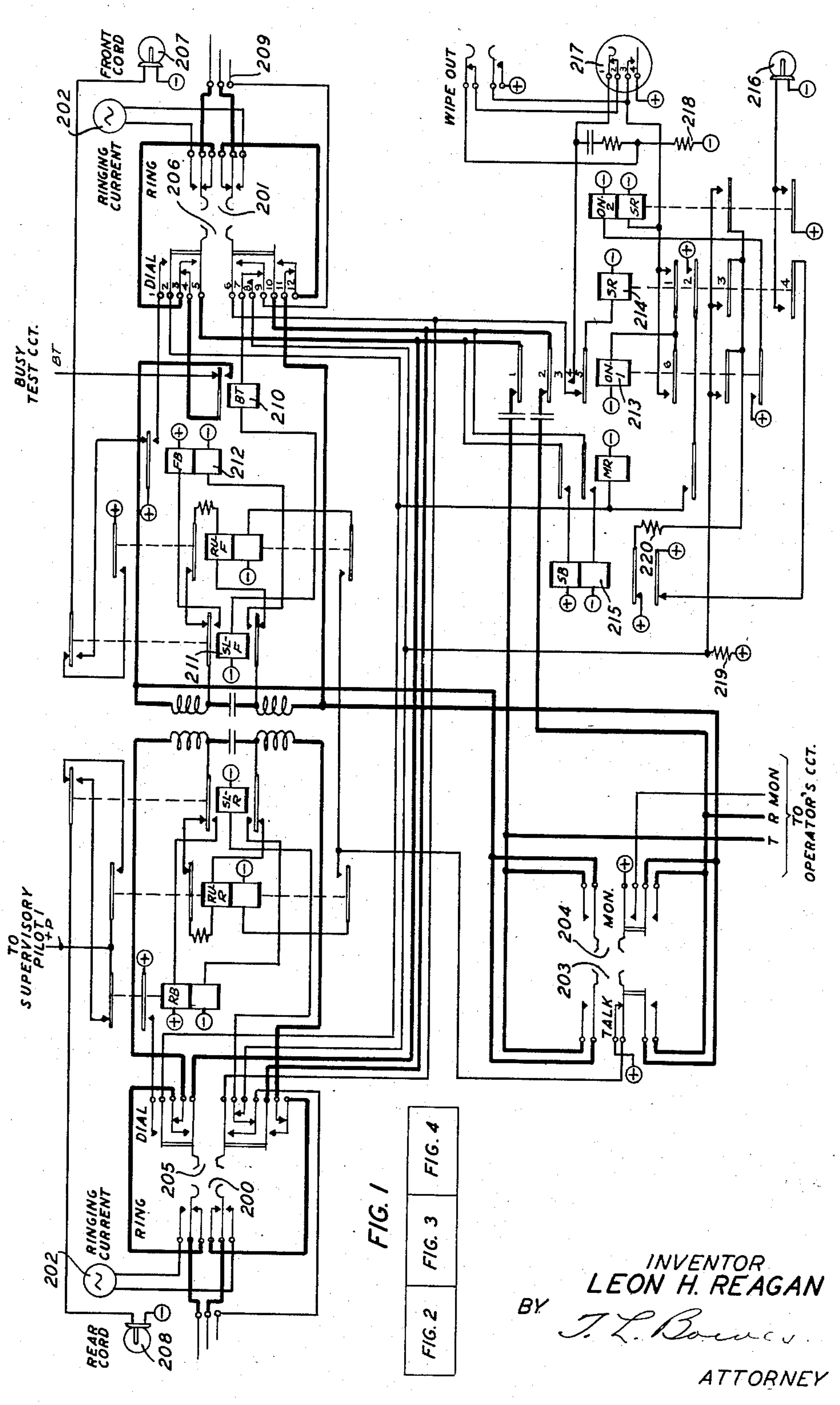
Fig. 1 is a block diagram showing how Figs. 2, 3 and 4 may be placed to form a complete circuit diagram from a cord circuit of Fig. 2 through the trunk and selector circuit of Fig. 3 and a connector circuit of Fig. 4.
Fig. 2 is a schematic circuit diagram of a universal cord circuit useful in extending both local and toll connections.

The cord circuit of Fig. 2 is of the type known as a universal circuit in that it may be used for a plurality of functions. It is provided with three key levers each operating in two directions and thus providing six individual keys. There is first the ringing key 200 for the rear cord and the ringing key 201 for the front cord. Both of these keys are of the non-locking type and will remain operated only so long as the operator manipulates them. Each key will connect the tip and ring of its associated plug to a source of ringing current, such as the source 202 shown as two separate sources on the drawing but actually a single source.

There is a talking key 203 by which the operator may connect her operator's circuit to the cord circuit without affecting the dial circuit. A monitoring key 204 allows the operator to monitor on the connection without introducing her transmitter circuit. These keys are of the locking type as shown. There is also a dial and talking key 205 for the rear cord and a similar dial and talking key 206 for the front cord. Each of these keys will connect the operator's circuit to the respective cord and cut off the other cord so that the connection through the cord circuit may be split. The dial circuit is enabled by the operation of either of these keys.

The sleeve supervisory circuit may be shortly described as a means for operating the lamp 207 of the front cord or, similarly, lamp 208 of the rear cord. This circuit extends from the sleeve 209 of the plug through springs 9 and 7 of the dial key 206, the busy test relay 210 and the sleeve relay 211 of the front cord. If the sleeve resistance of the trunk is low, then the SL–F relay 211 will be operated and thus the lamp 207 will be included in a circuit from ground, armature 1 and back contact of the FB relay 212, the front contact and armature 1 of the SL–F relay 211, the lamp 207 to battery. It will be noted hereinafter that when the called subscriber, by way of example, answers the sleeve resistance will be increased so that the SL–F relay 211 will release. In this case the lamp 207 will go dark to indicate the answer of the called subscriber.

When the dial key 206 is operated then the sleeve circuit may be traced from the sleeve 209 through springs 9 and 6 of the dial key 206, back contact and armature 5 of the ON–1 relay 213, the winding of the SR relay 214 to battery. In this case a low resistance in the sleeve of the trunk will cause the operation of the SR relay 214 and this, in turn, will complete a circuit from the armature 2 and back contact of the SB relay 215, armature 4 and front contact of the SR relay 214, the start stop dial lamp 216 to battery. The start stop lamp thus lighting will indicate that the operator may proceed to dial. It may be shortly noted at this point that in some connections which may be extended by this cord circuit a control signal sent back from a distant point will introduce a resistance in the sleeve circuit so that the SR relay 214 will be released. Under these conditions the start stop dial lamp 216 will go dark and thus indicate that the distant apparatus is not ready to receive dial pulses. When the distant apparatus has come into condition to receive dial pulses then the sleeve circuit will be changed to a low resistance, the SR relay 214 will be operated and the lamp 216 will be relighted. When the dial key 206 is normal then the SL–F relay 211 responds to the high and low resistance sleeve circuit and operates the supervisory lamp 207. When the dial key 206 is operated as above described, then the response of the SR relay 214 to the high and low sleeve circuit is translated into a shunting of the high resistance 219 by the low resistance 220 to operate the SL–F relay 211 so that the supervisory signals are displayed by the lamp 207 as well as the lamp 216.

When the dial is operated a circuit will be extended from ground through its off normal contacts 3 and 4, the front contact and armature 1 of the SR relay 214, the winding of the ON–1 relay 213 to battery. Through the operation of the ON–1 relay 213 the operator's circuit will be disconnected from the cord at armatures 1 and 2 thereof and the dial contacts 1 and 2 will be substituted in the sleeve circuit from the SR relay 214 by the springs 3 and 4 of armature 5 of the ON–1 relay 314. Therefore, as soon as the dial is moved off normal the sleeve circuit will be changed to include the springs 1 and 2 of the dial 217 through a resistance 218 to battery. The ON–1 relay 213 through its armature 6 and front contact locks itself to the off normal contacts of the dial to maintain the dial circuit after the SR relay 214 has released.

The many other functions of this cord circuit are not described herein as they are not involved in the present invention.

Figure 3:
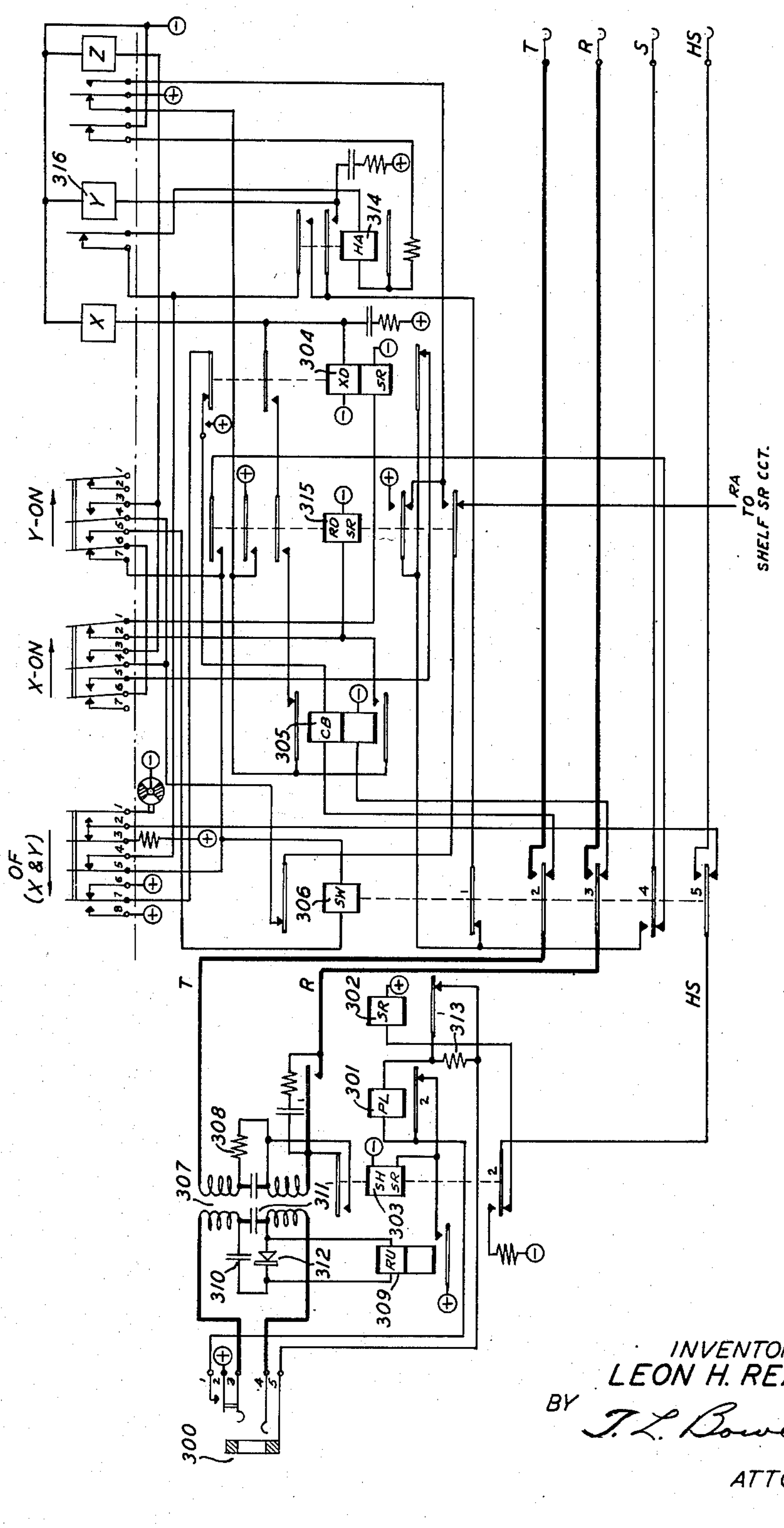
Fig. 3 is a schematic circuit diagram showing the trunk circuit of the present invention and a simple selector in which such trunk circuit terminates.

Fig. 3 is a combination of trunk circuit and selector in which such trunk circuit terminates. The principal functions of the trunk circuit are (1) to provide for cord sleeve dialing, (2) to provide for cord supervising on the sleeve lead, (3) to provide loop dialing to succeeding equipment, (4) to provide HS supervising to or from succeeding equipment, (5) to provide the operator a means for controlled ringing, and (6) to provide toll marking on the HS lead.

When the toll operator inserts her cord plug in the jack 300 associated with this trunk, a low resistance connection is extended from springs 2 and 1 of the jack winding of the PL relay 301, armature 1 and back contact of the SR relay 302, the sleeve of the jack 300 and thence through the circuit provided in the cord circuit to battery. This will cause the operation of the PL relay 301 so that the loop to the selector is closed through armature 1 and front contact of the PL relay 301 at the same time the circuit for the first slow SH relay 303 is opened at armature 2 and back contact of the PL relay 301. The loop dialing circuit may therefore be traced from overflow springs 6 and 7 of the selector overflow contacts, armature 1 and back contact of the XD relay 304, upper winding of the CB relay 305, back contact and armature 2 of the SW relay 306, the tip conductor through the upper right winding of the repeating coil 307, resistance 308, lower right winding of the repeating coil 307, armature 1 and front contact of the PL relay 301, the ring conductor, armature 3 and back contact of the SW relay 306, the lower winding of the CB relay 305 to battery. The CB relay responds to this circuit. The PL relay 301 remains operated as long as the circuit is held by the operator.

Since the SR relay 302 is not operated at this time the resistance of the sleeve circuit will be low and hence the start stop dial lamp 216 will be lighted. When the operator starts dialing after receiving the start-dial signal in her cord circuit, dial pulses are sent out through the sleeve lead to the PL relay 301 which will alternately operate and restore following the impulses from the dial. Thus the opening and closing of the ring lead contacts of the PL relay extend the pulses through the loop circuit to the succeeding equipment. When the PL relay 301 restores during the last half cycle of the dialed first digit, a circuit is closed from battery to a winding of the SH relay 303, the back contact and armature 2 of the PL relay 301 to the ground contact made by the mechanical operation of the jack 300. The first slow relay 303 operates and through its armature 1 and front contact short circuits the lower right winding of the repeating coil 307 to improve the transmission of dial pulses to the succeeding equipment. Through its armature 2 the SH relay 303 changes the HS lead from a connection to ground over its rear contact and the winding of the SR relay 302, to a connection to battery through its front contact, thus producing a toll marking signal to the succeeding equipment.

The operator may withhold ringing in the distant apparatus by not operating her ringing key until she wishes to extend the call. Operation of the ringing key connects generator to the tip and ring leads of the jack through the left hand windings of the repeating coil 307, condensers 310 and 311, the rectifier 312 and the upper winding of the RU relay 309. The consequent operation of the RU relay operates the SH relay 303 and thus changes the HS lead from a ground to a battery connection for the purpose of starting the ringing in the distant apparatus.

*Supervision*

When this circuit encounters an on-hook condition or idle line, a low resistance ground forwarded over the HS lead shunts the SR relay 302 thus shunting the resistance 313 in the sleeve circuit to operate relays in the cord circuit and to cause the operation of the supervisory lamps therein. When this circuit encounters an off-hook condition or busy line, a low resistance battery forwarded over the HS lead through the armature 2 and back contact of the SH relay 303 and the winding of the SR relay 302 causes the operation of this latter relay and therefore introduces the resistance 313 into the sleeve circuit to release the supervisory relays in the cord circuit.

*Recall*

If the called party wishes to recall the toll operator he may do so by operating his hook switch which will alternately connect a low resistance battery and ground on the HS lead to operate and release the SR relay 302. Operation and release of the SR relay alternately connects a low and a high resistance ground on the sleeve lead which will cause a relay in the cord circuit to give a flashing pulse to the supervisory lamp.

If the operator wishes to recall the called party after he has hung up then she will place ringing current on the line and reoperate the RU relay 309 which, in turn, operates the SH relay 303 to change the toll marking signal on the HS lead.

*Release*

Release of the circuit is under control of the operator. When the called party disconnects the operator receives a disconnect supervision signal over the sleeve lead and removes the cord. In removing the cord from the jack the operator opens the ground provided at the contacts 1 and 2 of the jack 300 and this causes the PL relay to release. When the PL relay 301 releases it opens the loop circuit to restore the distant connector involved in the connection.

*The selector*

The selector of Fig. 3 is conventional. The principal function of this device is to select a wanted connection and then to extend a clear metallic circuit therethrough consisting of the four paths, the tip, the ring, the sleeve and the HS supervisory path. Only one of these, the sleeve, has any connection to the circuit of the selector and this consists of a series circuit through the comparatively high resistance of the SW relay 306 and the comparatively low resistance of the HA relay 314 whereby the SW cut through relay 306 is maintained energized from a ground on the sleeve supplied by the connector or other circuit beyond. When this ground is removed then the SW relay releases and the slector is restored to normal.

Briefly, the selector has a CB calling bridge relay 305 which responds to seizure of the selector and then repeats the train of pulses transmitted thereto for the purpose of moving the brushes in their X or primary selecting movement. There are the usual two slow releasing relays, the RD relay 315 which remains energized through the energization of the calling bridge relay and the XD relay 304 which operates and holds steadily operated during the receipt of the train of impulses for setting the selector in its X direction. Thereafter the HA relay 314 and the Y magnet 316 interact with the SW relay short-circuited by the grounds on the sleeves of busy lines until a free line is encountered when the SW relay is placed in series with the HA relay and cuts through the four leads of the selector. The comparatively high resistance of the SW relay prevents further operation of the HA relay and thus stops the operation of the Y magnet. Release, as stated, takes place when the sleeve is freed of ground.

*The connector*

Figure 4:
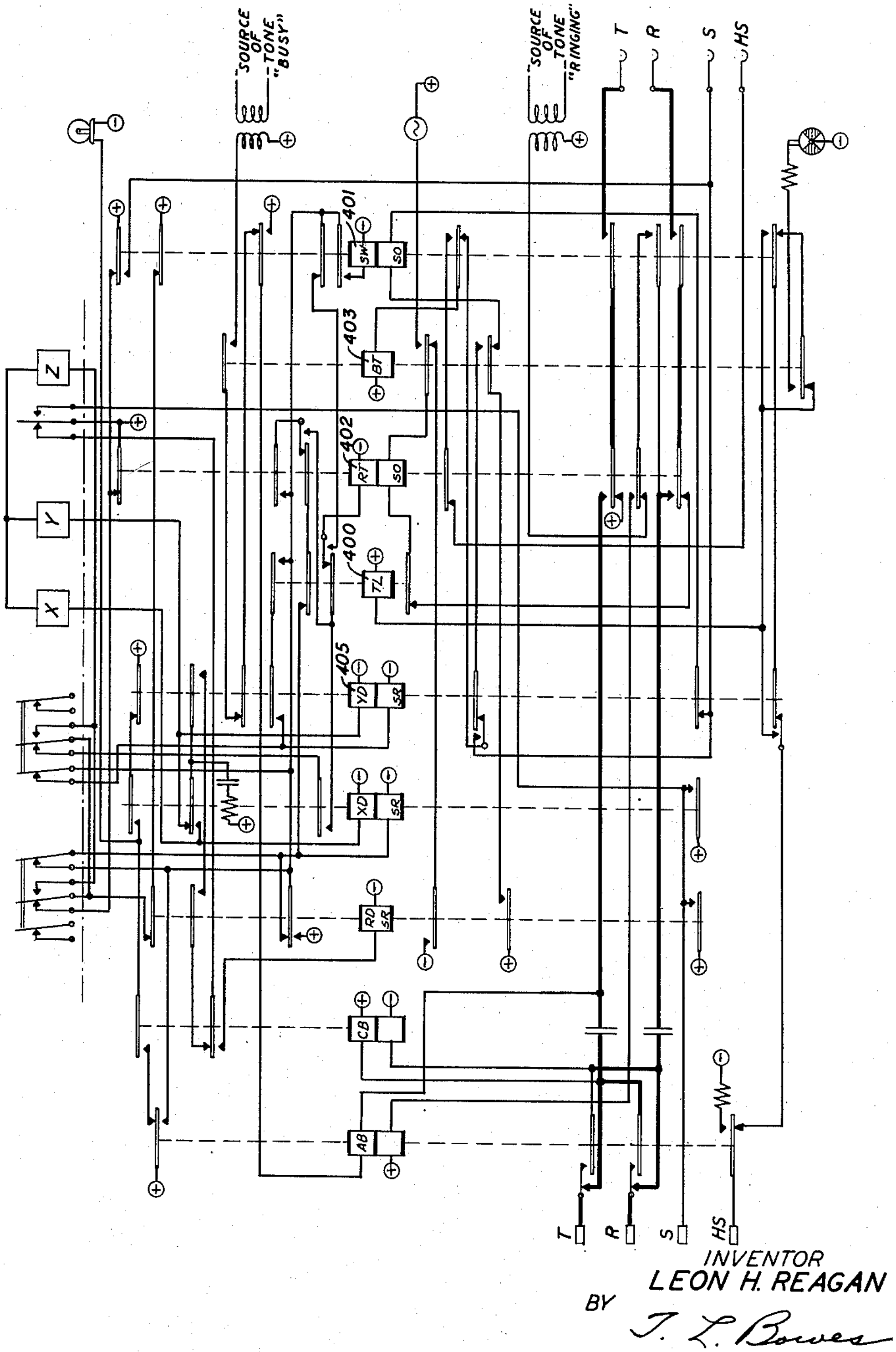
Fig. 4 is a schematic circuit diagram of a connector circuit which may be reached from the selector of Fig. 3 either directly, as is shown herein by way of example, or over a toll line when the selector of Fig. 3 is used as a toll selector.

The connector shown in Fig. 4 is also conventional but is shown here in some detail to explain the effect of the operation of the RU relay 309 of Fig. 3.

The noteworthy feature of this connector is the TL relay 400. When the cord circuit of Fig. 2 is employed and the SH relay 303 has been operated, then the HS lead is active and hence during dialing this lead is connected to battery so that the TL relay 400 operates and remains operated for a short period after the brushes of the connector have reached the called line.

If the called line is idle then the SW relay 401 operates, grounds the sleeve of the called line and closes a locking circuit for itself which will be maintained until both parties to the connection hang up. The SW relay 401 opens the normal holding path for the RT ringing trip relay 402, connects the BT relay 403 to the HS brush of the connector and connects the TL relay 400 to the incoming HS lead so that it may later respond to the ringing signal. Thus the operator has seized the line and marked it as busy and may withhold ringing until she wishes to summon the called party.

The TL relay 400 is operated during the dialing of the last digit and remains operated until after the YD relay 405 has released. During this time the RT relay 402 is operated. If the called line is idle then the SW relay 401 operates and opens the holding circuit of the RT relay 402 but before this can become effective the TL relay 400, through the operation of the SW relay 401, releases and completes a holding circuit for the RT relay 402. Thus, if the TL relay is operated when the called line is tested for its busy or idle condition, the ringing trip relay is locked up and the application of ringing current to the called line is prevented.

Should a party on the line attempt to place a call while the toll operator is holding the line the AB relay 404 will operate to give the toll operator supervision by transferring the HS lead to battery.

When the operator wishes to ring, battery is forwarded on the HS lead as hereinbefore described and now causes the operation of the TL relay 400. The operation of this relay now opens the holding circuit of the RT relay 402 so that this relay restores and prepares a circuit for ringing which becomes effective when the TL relay 400 restores as the HS lead is again grounded. Thereupon the BT relay 403 is operated from ground on the HS lead to the called line circuit and generator or ringing current is applied to the called line through the lower winding of the RT relay 402. Thus the TL relay 400 controls the ringing and will unlock the RT relay 402 at any time after the SW relay 401 has become operated either to ring the called party for the original call or later on for a recall. Other operations of the connector of Fig. 4 are conventional. When the called subscriber answers the AB relay 404 responds and by reversing the line current causes the operation of the cord circuit supervisory relay as hereinbefore described.

What is claimed is:

1. In a telecommunication system, a switchboard provided with cord circuits having sleeve supervisory and dialing circuits, a trunk line terminating in a jack in said switchboard and extending to a selector, said jack having tip, ring and sleeve contacts for making electrical contact with corresponding elements of a cord circuit plug and an additional pair of contacts mechanically closed by the insertion of a cord circuit plug in said jack, a supervisory and dialing circuit for said trunk including the sleeve of said jack, a dialing relay and said additional pair of contacts, and a loop dialing circuit for said selector controlled by said relay.

2. In a telecommunication system, a switchboard provided with sleeve supervisory and sleeve dialing cord circuits, a trunk line terminating in a jack in said switchboard accessible to said cord circuits and extending to a selector, a sleeve circuit for said trunk including the sleeve of said jack, a normally shortcircuited resistor, a dialing relay and a contact mechanically closed by the insertion of a cord circuit plug in said jack, a loop dialing circuit for said selector controlled by said relay and a control conductor from said selector for opening said shortcircuit about said resistor to change said sleeve circuit from a comparatively low resistance to a comparatively high resistance.

3. In a telecommunication system, a switchboard provided with sleeve supervisory and sleeve dialing cord circuits, a ringing key for applying ringing current to the talking conductors of each said cord circuit, a trunk line terminating in a jack in said switchboard accessible to said cord circuits and extending to a selector, said trunk line between said switchboard termination and said selector comprising a pair of talking conductors and a control conductor, a sleeve circuit for said switchboard termination of said trunk including the sleeve of said jack, a normally shortcircuited resistor, a dialing relay and a contact mechanically closed by the insertion of a cord circuit plug in said jack, a loop dialing circuit for said selector including said talking conductors extending to said selector controlled by said relay, a slow releasing relay controlled by said first relay for controlling connections to said control conductor extending to said selector, a third relay responsive to ringing current transmitted to said trunk from said cord circuit ringing key, said third relay also having control over said slow releasing relay, and a fourth relay responsive to incoming signals over said control conductor from said selector for opening said short circuit about said resistor.

4. In a telecommunication system, a switchboard provided with universal cord circuits each terminating in a rear plug and a front plug, each said cord circuit having a talking key for connecting an operator's set to said cord circuit, a talking and dialing key individual to each end of said cord circuit, a ringing key individual to each end of said cord circuit for applying ringing current to the talking conductors thereof, a sleeve supervisory circuit, a dial, and means controlled by said dial for temporarily appropriating said sleeve circuit for the transmission of dial signals thereover, a trunk circuit terminating in a jack in said switchboard accessible to said cord circuits and extending to a selector, said selector having a set of four brushes for extending tip, ring, sleeve and helping sleeve circuits, tip, ring and helping sleeve conductors between said trunk circuit and said selector, a circuit in said trunk including in series the sleeve of said jack, a normally shunted resistor, a dialing relay, and a contact mechanically closed by the insertion of a cord circuit plug in said jack, said dialing relay being responsive to said cord circuit dial and having control over said tip and ring conductors to said selector, a slow releasing relay responsive to said dialing relay and having control over said helping sleeve conductor to said selector, a relay responsive to ringing current transmitted to said trunk circuit from one of said cord circuit ringing keys, said relay also having control over said slow releasing relay to transmit a signal over said helping sleeve conductor to said selector and a control relay for opening said shunt about said resistor, said control relay being responsive to signals transmitted from said selector over said helping sleeve conductor.

5. In a telecommunication system, a switchboard provided with universal cord circuits each terminating in a rear plug and a front plug, each said cord circuit having a talking key for connecting an operator's set to said cord circuit effective simultaneously over both said plugs, an operator's set and an operator's dial, a talking and dialing key individual to each end of said cord circuit for splitting the connection through said cord circuit and for associating said operator's set and said dial with the said associated plug of said cord circuit, a ringing key individual to each end of said cord circuit for applying ringing current to the talking conductors thereof, a supervisory lamp individual to each end of said cord circuit, a start-stop dial lamp common to said cord circuits and associated with said dial, means for operating said supervisory lamp over the sleeve conductors of each end of said cord circuits effective when all keys of said cord circuit are normal and alternatively when said talking key is operated, means controlled by said individual talking and dialing keys for transferring said sleeve circuit from said supervisory circuit to said start-stop dial lamp, a trunk circuit terminating in a jack in said switchboard accessible to said cord circuits and extending to a selector, said selector having a set of four brushes for extending tip, ring, sleeve and helping sleeve circuits, tip, ring and helping sleeve conductors between said trunk circuit and said selector, a circuit in said trunk including in series the sleeve of said jack, a normally shunted resistor, a dialing relay, and a contact mechanically closed by the insertion of a cord circuit plug in said jack, said dialing relay being responsive to said cord circuit dial and having control over said tip and ring conductors to said selector, a slow releasing relay responsive to said dialing relay and having control over said helping sleeve conductor to said selector, a relay responsive to ringing current transmitted to said trunk circuit from one of said cord circuit ringing keys, said relay also having control over said slow releasing relay to transmit a signal over said helping sleeve conductor to said selector and a control relay for opening said shunt about said resistor, said control relay being responsive to signals transmitted from said selector over said helping sleeve conductor.

6. In a telecommunication system, a switchboard provided with cord circuits having sleeve supervisory and dialing circuits and tip and ring ringing circuits, an outgoing trunk terminating in a jack in said switchboard, a sleeve circuit for said trunk including the sleeve of said jack, a normally shunted resistor, a relay winding and a circuit mechanically closed by an auxiliary contact on said jack, an outgoing tip and ring circuit for said trunk under control of said relay, an outgoing helping sleeve control circuit for said trunk, means controlled from the distant end of said trunk for opening said normal shunt about said resistor and a relay in said trunk responsive to ringing current for controlling said outgoing helping sleeve control circuit.

References Cited in the file of this patent

UNITED STATES PATENTS

| | | |
|---|---|---|
| 2,210,739 | Ulrich | Aug. 6, 1940 |
| 2,632,813 | Bakker | Mar. 24, 1953 |